(12) United States Patent
Zwieg et al.

(10) Patent No.: US 7,674,147 B2
(45) Date of Patent: Mar. 9, 2010

(54) GENERATOR SET EXHAUST PROCESSING SYSTEM AND METHOD

(75) Inventors: Brian Zwieg, Sheboygan, WI (US); Richard Koehl, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 11/856,597

(22) Filed: Sep. 17, 2007

(65) Prior Publication Data

US 2008/0050991 A1 Feb. 28, 2008

Related U.S. Application Data

(63) Continuation-in-part of application No. 11/247,627, filed on Oct. 11, 2005, now abandoned.

(60) Provisional application No. 60/621,134, filed on Oct. 22, 2004.

(51) Int. Cl.
*F01N 3/04* (2006.01)
*F01N 3/28* (2006.01)
*F01N 7/00* (2006.01)
*B63B 35/73* (2006.01)
*F01N 3/20* (2006.01)
*F01N 1/08* (2006.01)
*B63H 21/32* (2006.01)
*B63H 20/24* (2006.01)

(52) U.S. Cl. .................. 440/89 H; 440/89 E; 440/89 C; 440/89 J; 440/88 J; 440/88 A

(58) Field of Classification Search .............. 440/89 H, 440/89 E, 89 C, 88 J, 88 A
See application file for complete search history.

(56) References Cited

U.S. PATENT DOCUMENTS

| 4,178,873 | A | | 12/1979 | Bankstahl |
| 4,972,809 | A | | 11/1990 | Hirasawa |
| 5,014,660 | A | | 5/1991 | Westerbeke, Jr. |
| 5,125,378 | A | | 6/1992 | Westerbeke, Jr. |
| 5,212,949 | A | | 5/1993 | Shiozawa |
| 5,408,827 | A | * | 4/1995 | Holtermann et al. ......... 60/298 |
| 5,809,776 | A | | 9/1998 | Holtermann et al. |
| 5,899,063 | A | | 5/1999 | Leistritz |

(Continued)

FOREIGN PATENT DOCUMENTS

CH  679460 A5  2/1992

(Continued)

*Primary Examiner*—Daniel V Venne
(74) *Attorney, Agent, or Firm*—Quarles & Brady LLP

(57) ABSTRACT

A generator set (genset) for use in a marine environment is disclosed. The genset includes an alternator, an engine dedicated to driving the alternator, and an exhaust port connected to the engine to receive exhaust generated during operation of the engine to drive the alternator. An inner tubular structure is provided that is configured to receive exhaust gases from the exhaust port and communicate the exhaust gases therethrough. The exhaust processing device also includes an exhaust processing element mounted within the inner tubular structure to process the exhaust gases and an outer tubular structure mounted around the inner tubular structure to form an intermediate space therebetween. The exhaust processing device further includes at least one orifice through which to deliver a flow of water to the intermediate space to maintain the outer tubular structure at a temperature below a temperature of the exhaust processing element.

9 Claims, 4 Drawing Sheets

U.S. PATENT DOCUMENTS

| | | | |
|---|---|---|---|
| 6,116,022 A | 9/2000 | Woodward | |
| 6,149,478 A * | 11/2000 | Lehmann | 440/88 R |
| 6,155,896 A | 12/2000 | Suzuki | |
| 6,283,808 B1 * | 9/2001 | Lehmann | 440/88 R |
| 6,511,355 B1 | 1/2003 | Woodward | |
| 6,551,155 B2 | 4/2003 | Lecours et al. | |
| 6,840,825 B1 * | 1/2005 | Messano | 440/12.52 |
| 6,902,448 B2 * | 6/2005 | Wilson | 440/49 |
| 2003/0209008 A1 | 11/2003 | Mills et al. | |
| 2004/0035100 A1 | 2/2004 | Westerbeke, Jr. et al. | |
| 2005/0161281 A1 | 7/2005 | Klinkert et al. | |

FOREIGN PATENT DOCUMENTS

EP  928885 A2  7/1999

* cited by examiner

GENERATOR SET EXHAUST PROCESSING SYSTEM AND METHOD

CROSS REFERENCE TO RELATED APPLICATIONS

This application is a continuation-in-part of U.S. patent application Ser. No. 11/247,627, filed Oct. 11, 2005 now abandoned, and entitled "GENERATOR SET EXHAUST PROCESSING SYSTEM AND METHOD," which claims the benefit of U.S. Provisional Application 60/621,134 filed Oct. 22, 2004, entitled "Exhaust Processing Assembly for Marine Application."

STATEMENT REGARDING FEDERALLY SPONSORED RESEARCH OR DEVELOPMENT

Not applicable.

FIELD OF THE INVENTION

The present invention relates generally to generator sets and, more particularly, to an exhaust possessing system for generator sets employed within watercraft such as pleasure boats.

BACKGROUND OF THE INVENTION

Watercraft such as sport boats, cruisers, sailboats, yachts, fishing boats, jet boats, and the like, commonly employ on-board generator sets (often referred to as "gensets") to generate electricity for use on the watercraft. The gensets typically include an alternator driven by a dedicated internal combustion engine. As with all internal combustion engines, the engines of gensets produce exhaust. This exhaust, if unprocessed, has various components that are undesirable for a number of reasons, such as potentially pollutive elements and undesirable smells.

Despite these undesirable characteristics of exhaust, relatively few watercraft employ any exhaust-processing devices in conjunction with onboard gensets to eliminate or reduce the undesirable exhaust components from the exhaust being expelled into the environment. In fact, with the exception of watercraft employing gensets having high-power ratings (e.g., above 25 hp), conventional watercraft are not mandated by current Environmental Protection Agency (EPA) requirements to employ any exhaust-processing devices.

Further, while some watercraft (particularly larger watercraft that employ high-power gensets) employ exhaust-processing devices, these devices are not readily applicable to smaller watercraft, particularly pleasurecraft because they add to the size and cost of the genset and present a relatively hot surface that cannot be adequately arranged within the confined spaces of smaller watercraft. That is, the exhaust emanating from gensets is typically at a high temperature and may reach temperatures of up to 1500 degrees Fahrenheit. Accordingly, the exhaust created by an individual genset can rapidly heat up an exhaust-processing device to present an external surface that is extremely hot, albeit, not as hot as the exhaust itself. In smaller watercraft, however, due to the relatively cramped quarters on the craft, it is difficult to arrange a genset and an associated exhaust-processing system so that people will not brush up against, or otherwise come into contact with, the heated surfaces of the system.

It would therefore be desirable to provide a system and method for processing exhaust produced by a genset disposed on a watercraft. It would be further desirable to provide a system and method for processing exhaust produced by a watercraft genset to reduce undesirable components of the exhaust before the exhaust is expelled from the watercraft. It would also be desirable to provide a system and method for protecting against contact with heated surfaces of an exhaust-processing system associated with a genset disposed in a small watercraft, where people might come into contact with the exhaust-processing device.

SUMMARY OF THE INVENTION

The present invention overcomes the aforementioned drawbacks by providing a system and method for processing exhaust produced by a watercraft genset to reduce undesirable components of the exhaust before the exhaust is expelled from the watercraft. Furthermore, a system and method protects the exhaust-processing system from presenting external surfaces with undesirable temperatures.

In accordance with one embodiment, a genset for use in a marine environment is disclosed. The genset includes an alternator, an engine dedicated to driving the alternator, and an exhaust port connected to the engine to receive exhaust generated during operation of the engine to drive the alternator. An inner tubular structure is provided that is configured to receive exhaust gases from the exhaust port and communicate the exhaust gases therethrough. The exhaust processing device also includes an exhaust processing element mounted within the inner tubular structure to process the exhaust gases and an outer tubular structure mounted around the inner tubular structure to form an intermediate space therebetween. The exhaust processing device further includes at least one orifice through which to deliver a flow of water to the intermediate space to maintain the outer tubular structure at a temperature below a temperature of the exhaust processing element.

In accordance with another embodiment, a genset assembly for use in a watercraft is disclosed. The genset assembly includes a genset having an alternator and an engine having an exhaust manifold and dedicated to driving the alternator. The genset assembly also includes an exhaust processing device coupled to the exhaust manifold of the engine. The exhaust processing device further includes an inner conduit to receive exhaust from the exhaust manifold at an input end and allow the exhaust to pass therefrom to an output end and an exhaust processing element positioned within the inner conduit to reduce undesirable exhaust components. Additionally, the exhaust processing device includes an outer conduit positioned about the inner conduit to define an intermediate space therebetween, wherein upon operation of the genset, a temperature of the outer conduit is maintained to be lower than a temperature of the inner conduit by a flow of water through the at least one intermediate space.

In accordance with yet another embodiment, a watercraft is disclosed. The watercraft includes a propeller configured to drive the watercraft, a first engine configured to drive the propeller, and a first exhaust port extending at least partially through the propeller to expel exhaust generated by the first engine. The watercraft also includes a genset having a second engine, an alternator configured to be driven by the second engine, and a second exhaust port to receive exhaust generated by the second engine. An exhaust processing device is provided that is connected to the second exhaust port and includes an inner passage to receive exhaust gases from a genset and communicate the exhaust gases to an output port. The exhaust processing device further includes an exhaust processing element mounted within the inner passage to reduce undesirable components in the exhaust and an outer wall of the exhaust processing device surrounding the inner passage. Additionally, the exhaust processing device includes an insulating passage arranged between the exhaust processing element and the outer wall to receive a flow of water therethrough. Furthermore, the exhaust processing device includes an insulating chamber arranged between the exhaust processing element and the outer wall and having a static insulating medium disposed therein, wherein the insulating passage and the insulating chamber work in concert to maintain a temperature of the outer wall that is substantially reduced from the operating temperature of the exhaust processing element.

Various other features and advantages of the present invention will be made apparent from the following detailed description and the drawings.

DETAILED DESCRIPTION OF THE PREFERRED EMBODIMENT

Figure 1:
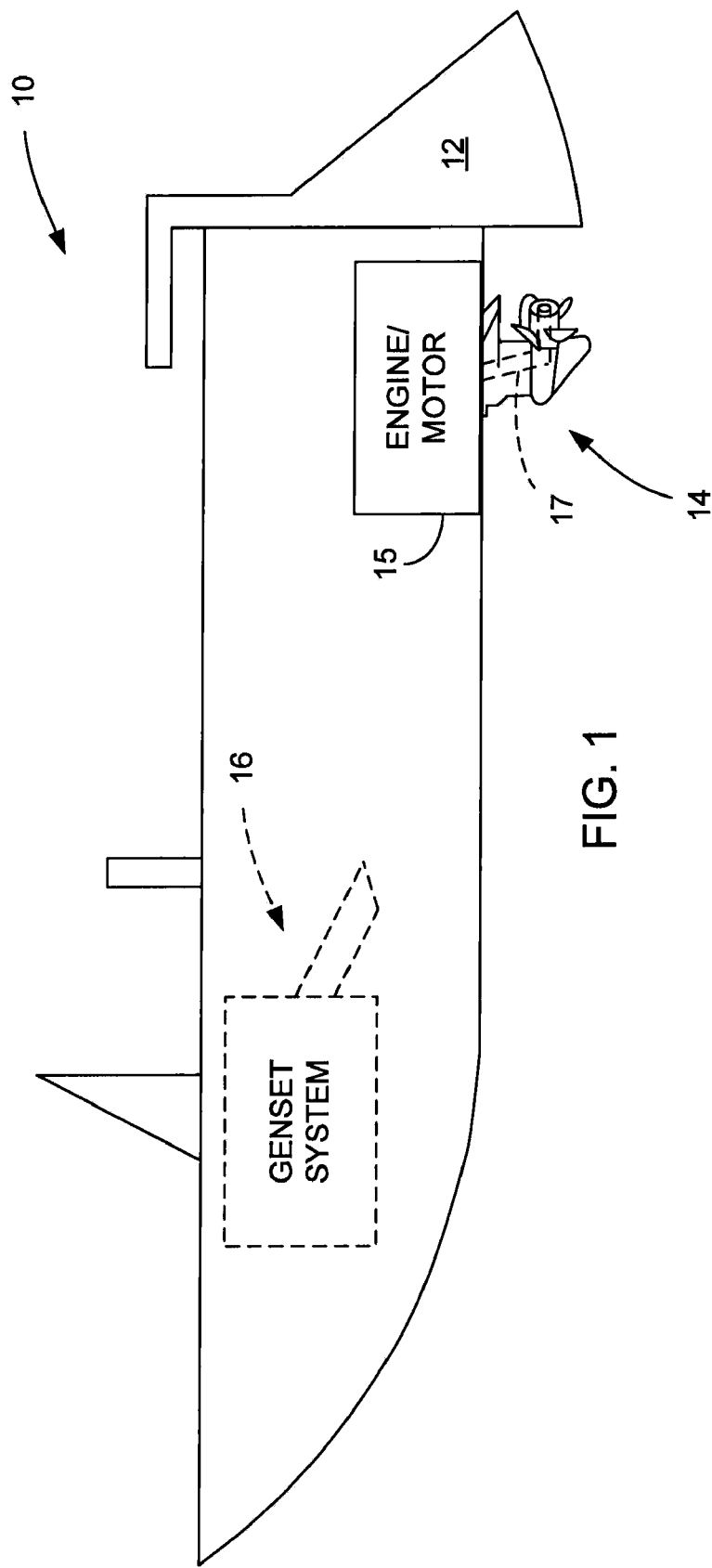
FIG. 1 is an elevation view of a watercraft having a generator set and exhaust-processing system in accordance with the present invention.

Referring to FIG. 1, a small watercraft 10 is represented as a speedboat. The watercraft includes, among other components, a rudder 12 and a propeller 14 that is driven by an associated engine 15 to propel the boat through the water. As is convention in the art, the propeller 14 also includes an exhaust port 17 through which exhaust generated by the engine 15 is expelled. Additionally, as will be described, the watercraft 10 includes a generator set (or "genset") system 16. The watercraft 10 could be, for example, a pleasure craft having a length in the range of 26 feet to 38 feet. Although shown to be a speedboat, the watercraft 10 is intended to be representative of a wide variety of different watercraft including, for example, sport boats, cruisers, sailboats, yachts, fishing boats, jet boats, and the like that employ gensets. In this regard, the present invention is intended to be applicable to a wide variety of smaller watercraft or other devices that employ gensets and that are able to draw upon a source of water.

Figure 2:
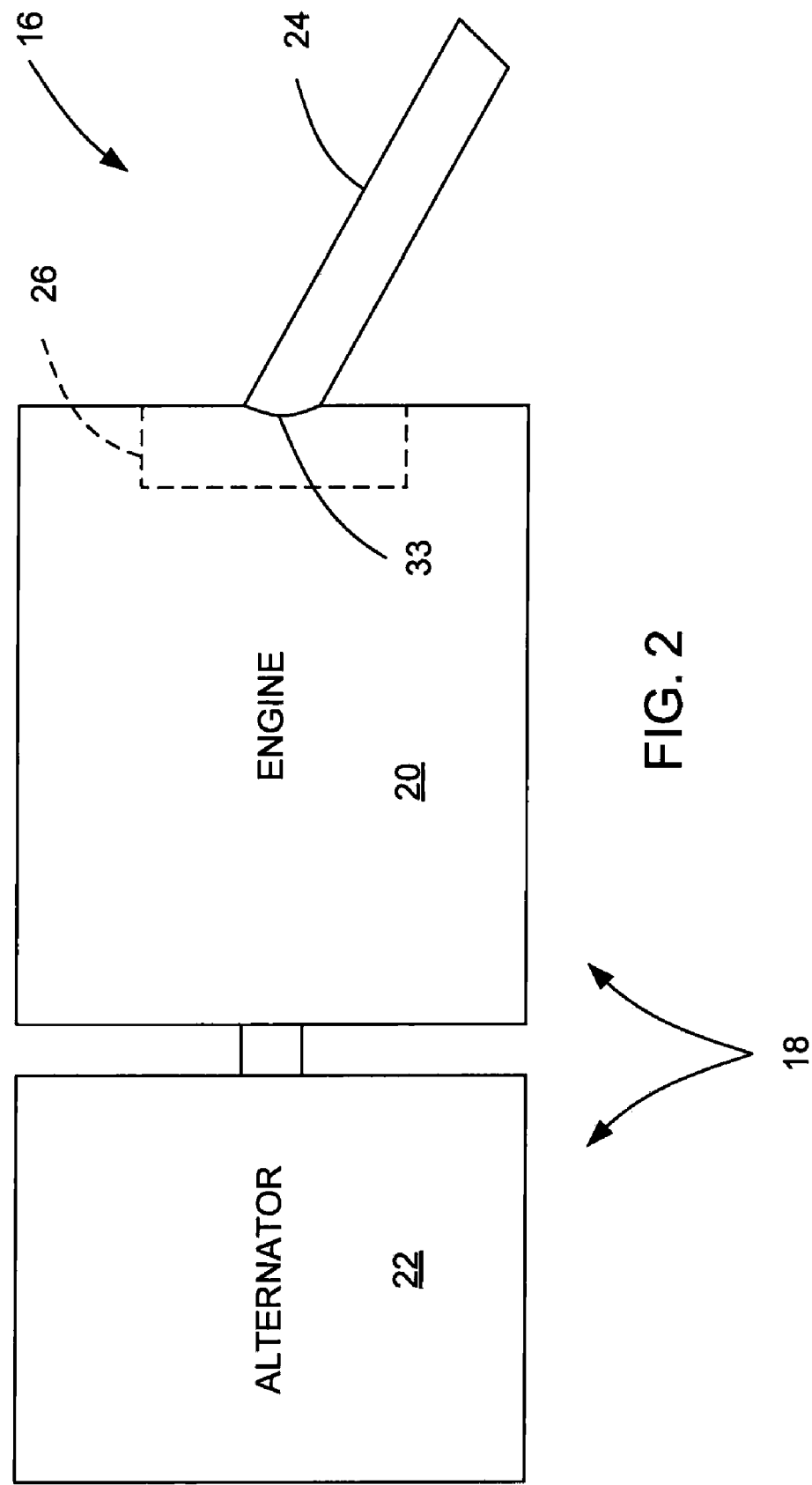
FIG. 2 is an elevation view of the generator set assembly with the exhaust processing device of FIG. 1, shown in greater detail.

Referring additionally to FIG. 2, the genset system 16 is shown in detail. The generator set assembly 16 includes a generator set (or "genset") 18 having an internal combustion engine 20 and an alternator 22. For example, the genset 18 could be a 5E Marine Generator Set or a 7.3E Marine Generator Set (rated at 5 kW or 7.3 kW, respectively) available from the Kohler Co. of Kohler, Wis. Additionally, in accordance the present invention, the genset system 16 further includes an exhaust processing device 24 for processing exhaust created by the engine 20 of the genset 18 and expelled from an exhaust manifold 26 of the engine/genset. The exhaust processing device 24 can be, for example, approximately 18 inches long. That is, the relative sizes of the exhaust processing device 24 and genset 18 shown in FIG. 2 are not necessarily illustrated to scale.

Figure 3:
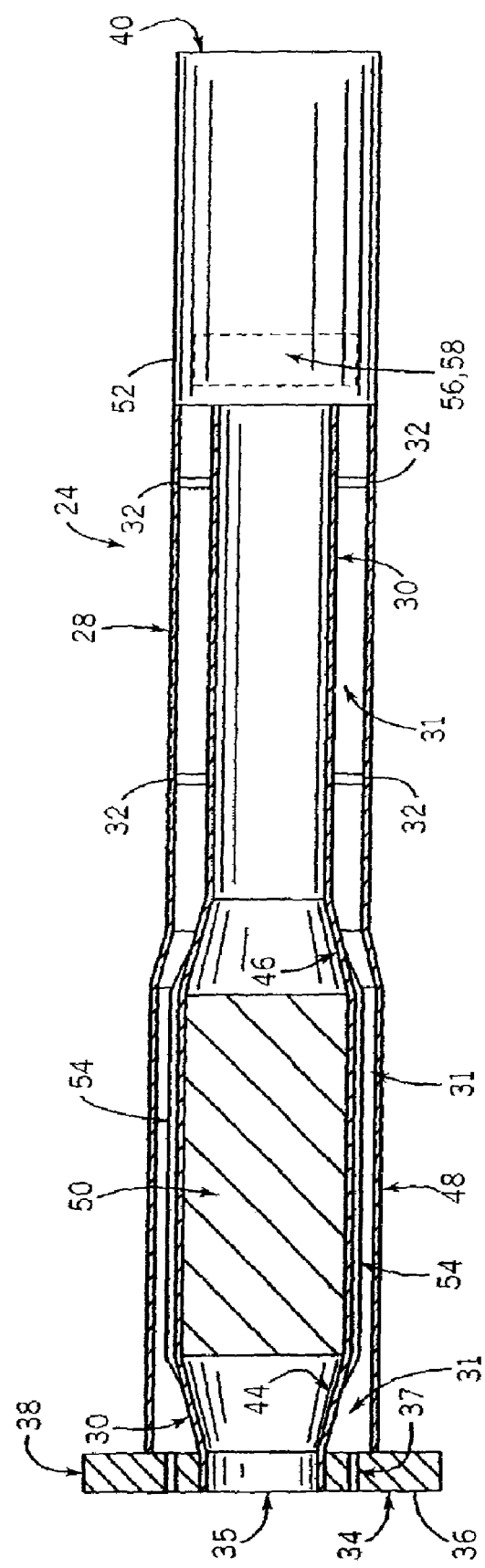
FIG. 3 is a cross-sectional view of one arrangement for the exhaust processing device of FIGS. 1-2.

Referring now to FIG. 3, a cross-sectional view of the exhaust processing device 24 according to one embodiment of the present invention is shown. As shown, the exhaust processing device 24 includes a first, outer tubular structure 28 and a second, inner tubular structure 30. In this regard, the first, outer tubular structure 28 is positioned substantially concentrically and coaxially around the second, inner tubular structure 30, so as to define an intermediate annular space 31 therebetween. As will be described, the intermediate annular space 31 forms an insulating passage to isolate the temperature of first, outer tubular structure 28 from the temperature of the second, inner tubular structure 30. The two tubular structures 28, 30 may be held in place relative to one another by way of struts 32 or similar structures extending within the intermediate annular space 31.

At a first end 34 of the exhaust processing device 24, the device 24 is configured to interface the exhaust manifold 26 of the generator set 18, as shown in FIG. 2. More specifically, the second, inner tubular structure 30 is configured to mate with a complementary tubular structure or output port 33 (as shown in FIG. 2) of the exhaust manifold 26 so that exhaust is communicated from the output port 33 directly into an inner passage 35 of the tubular structure 30, preferably with little or no leakage. In alternate embodiments, the device is configured to receive exhaust from a different structure having an exhaust output port, other than an exhaust manifold.

Referring again to FIG. 3, extending concentrically around and radially outward from the inner tubular structure 30 at the first end 34 is a mounting flange or face 36, which extends, according to one embodiment, beyond the periphery of the first, outer tubular structure 28. The mounting face 36 in the present embodiment has one or more (e.g., eight) orifices 37 spaced around the mounting face to form a passage to the intermediate annular space 31. Although the orifices 37 shown in FIG. 3 extend in an axial direction from the first end 34 axially inward to the intermediate annular space 31, it is contemplated that the orifices may extend from an outer circumferential surface 38 of the mounting face 36 radially inward to the intermediate annular space 31.

In either case, the orifices 37 provide a passage for water to be communicated from the exhaust manifold 26 through the mounting face 36 and into the intermediate annular space 31 of the exhaust processing device 24. Upon entering the intermediate annular space 31, the water flows down the length of the exhaust processing device 24, from the first end 34 to a second, outlet end 40.

Still referring to FIG. 3, the second, inner tubular structure 30 includes an outwardly tapering section 44 and an inwardly tapering section 46 separated by an intermediate large-diameter section 48 within which a catalytic conversion element 50 (or simply "catalyst") is supported/housed. Therefore, exhaust entering the second, inner tubular structure 30 at the first end 34 passes through the outwardly tapering section 44 and into the catalyst 50 within the large-diameter section 48, where the exhaust is processed before then passing into the inwardly tapering section 46, and then down the remainder of the structure 30 to the second, outlet end 40.

The catalyst 50 can be any of a variety of catalytic conversion elements known in the art such as a Platinum/Rhodium catalytic conversion element or other element used to reduce vehicle emissions and the like. The catalyst 50 can perform any of a number of exhaust processing/cleaning functions such as, for example, reduction in environmental pollutants or undesirable gases commonly found in exhaust (e.g., carbon monoxide). Although the present embodiment employs a catalytic conversion element as the catalyst 50, alternate forms of exhaust processing elements known in the art could also be utilized.

In operation, exhaust enters the inner tubular structure 30 at a high temperature (e.g., up to 1500° F.). As such, the catalyst 50 is specifically designed to operate optimally at these high temperatures. Accordingly, an outer surface 52 of the exhaust processing device 24 formed by the first tubular structure 28 is heated by the operating temperature of the catalyst 50. In this regard, to protect the outer surface 52 form reaching these high temperatures, water flows through the intermediate annular space 31 to perform the dual functionality of cooling and insulating. Accordingly, the first, outer tubular structure 28 creates a water jacket around the catalyst 50 by forming the intermediate annular space 31 as a passage through which water flows to maintain a temperature of the outer surface 52, preferably, such that the outer surface 52 would be comfortable to the touch.

Additionally, it is contemplated that the water may be forced, under pressure, through the orifices 37 and into the intermediate annular space 31. In this regard, it is contemplated that the water is pressurized, for example to 3 to 5 pounds per square inch (psi), within the intermediate annular space 31.

As previously addressed, the catalyst 50 is specifically designed to operate optimally at the high temperatures associated with the exhaust that it is processing. Accordingly, to protect the catalyst 50 from being cooled by the water flowing through the intermediate annular space 31, an additional annular space 54 may be formed between the intermediate large-diameter section 48 of the inner tubular structure 30 and the catalyst 50 to provide insulation. Accordingly, the additional annular space 54 forms an insulating chamber that can be filled with a static insulating medium. For example, the additional annular space 54 may be filled with air. Accordingly, the additional annular space 54 also makes it possible to accommodate some expansion/contraction of the catalyst 50 without the placement of significant stress upon the inner tubular structure 30. On the other hand, the additional annular space 54 may be filled with fiberglass or similar insulating substances to provide additional protection against cooling the catalyst 50 as well as to protect the outer surface 52 from the operating temperature of the catalyst 50.

Therefore, as described above, the intermediate annular space 31 forms an insulating passage through which a liquid coolant flows to act as a dynamic insulator between the catalyst 50 and the outer surface 52 of the outer tubular structure 28. Additionally, the additional annular space 54 forms an insulating chamber that can be filled with a static insulating medium to further insulate the catalyst 50 from the outer surface 52 of the outer tubular structure 28, and vice versa. Accordingly, the insulating passage and the insulating chamber work in concert to maintain a temperature of the outer surface 52 that is substantially reduced from the operating temperature of the catalyst 50.

Additionally, as shown in FIG. 3, the inner tubular structure 30 terminates prior to the second, outlet end 40 formed by the outer tubular structure 28. Consequently, at a second end 56 of the inner tubular structure 30, the processed exhaust within the inner tubular structure 30 is mixed with the water flowing through the intermediate annular space 31. The mixture of water and processed exhaust then proceeds to the outlet end 40 of the exhaust processing device 24 where the mixture is expelled. To prevent the water from backflowing into the inner tubular structure 30, a flapper valve 58 may be disposed at the second end 56. In alternate embodiments, other devices for preventing such backflow could be used, such as a series of S-turns or other valves. However, if the water is pressurized within the intermediate annular space 31, it is contemplated that the pressure differential created between the intermediate annular space 31 and the exhaust path will render the flapper valve 58 or other backflow protection unnecessary.

Furthermore, the catalyst 50 is preferably removable and replaceable. For example, in the embodiment shown in FIG. 3, at least the mounting face 36 and the outwardly tapering portion 44 of the inner tubular structure 30 are removable so that the catalyst 50 can be removed and replaced. According to one embodiment, the intermediate large-diameter section 48 and the inwardly tapering portion 46 in addition to the aforementioned portions (or even all of these components plus the remainder of the tubular structure 30) are removable and, in some cases, replaceable. On the other hand, it is contemplated that the exhaust processing system 24 may be removed and replaced, as a whole, as needed.

Figure 4:
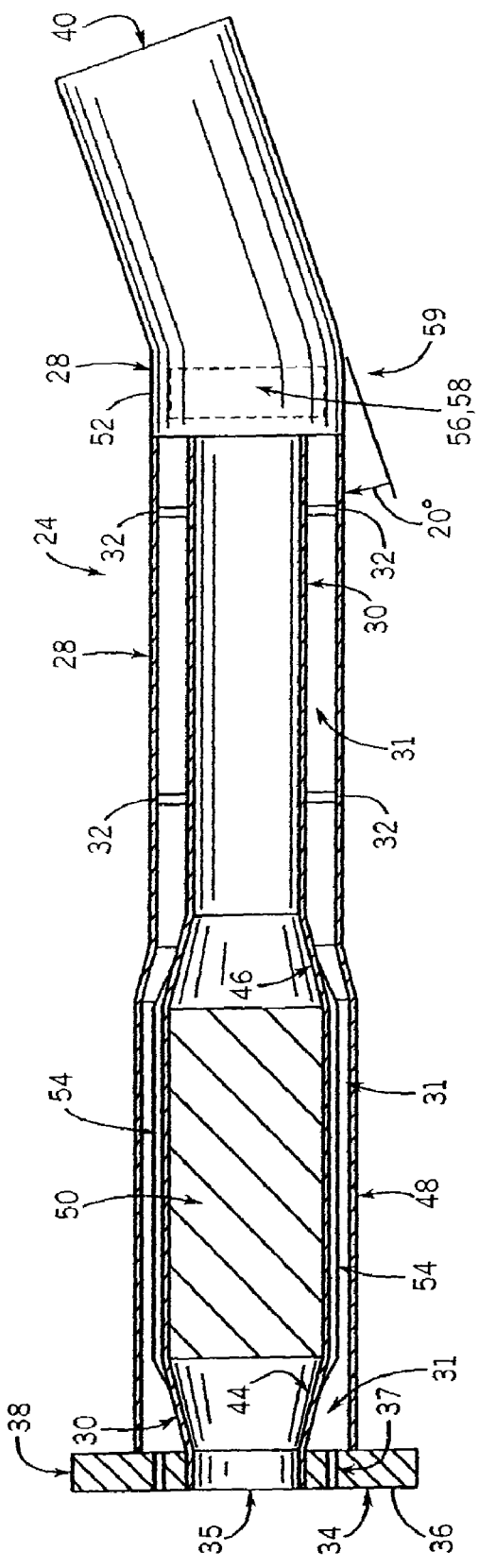
FIG. 4 is a cross-sectional view of another arrangement for the exhaust processing device of FIGS. 1-2.

Referring now to FIG. 4, the exhaust processing device 24 may include a slight bend 59 proximate the second end 56 of the inner tubular structure 30. This bend 59 is configured so that the general orientation of the portion of the exhaust processing device 24 proximate the outlet end 40 is substantially horizontal when the exhaust processing device 24 is installed relative to the genset 18 of FIG. 2, while the remainder of the conversion device has a generally downward slope from the first end 34, as shown in FIG. 2. The generally downward slope allows gravity to assist in moving the water through the intermediate annular space 31. As illustrated in the embodiment shown in FIG. 4, the bend 59 is approximately a 20 degrees bend. However, it is contemplated that the bend could involve a lesser or greater degree of directional change.

Figure 5:
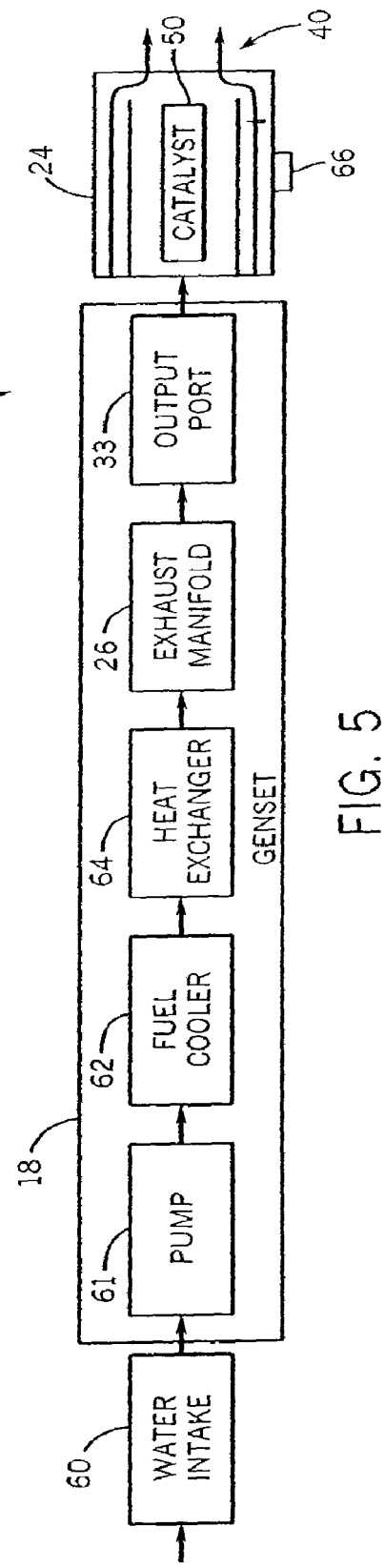
FIG. 5 is a block diagram showing the communication of water through the generator set system with the exhaust processing device of FIG. 1.

Referring now to FIG. 5, the general flow path of water through the genset system 16 is shown. According to the illustrated embodiment, water is provided to the exhaust processing device 24 by the genset 18. However, it is contemplated that the exhaust processing device 24 may include its own pump (not shown) so as to pull water directly from the water source (i.e. the lake, river, ocean, or other waterway through which the watercraft 10 of FIG. 1 travels) to the exhaust processing device 24.

As shown in FIG. 5, the genset 18 is connected to a water intake 60 that is in fluid communication with a body of water in which the watercraft 10 of FIG. 1 is operating. A pump 61 included in the genset 18 pulls water through the water intake 60 and pushes it to a fuel cooler 62, a heat exchanger 64, and, finally, the exhaust manifold 26 (or to a device adjacent to the exhaust manifold). The water then exits the genset 18 through the output port 33 to supply the water to the exhaust processing device 24. Due to the interaction of the water with the heat exchanger 64, the water within the exhaust processing device 24 is somewhat warmer than it is upon being received by the pump 61. As described above with respect to FIGS. 3 and 4, the water is then passed over the catalyst 50 and expelled from the exhaust processing device 24 at the end 40 to return the water to the body of water from where it was drawn. On a watercraft such as the watercraft 10 of FIG. 1, the water may be returned, for example, via a hose that connects the end 40 to an outlet under a swim platform (not shown) that is, for example, at least 4 inches above the water line.

Also, it is contemplated that one or more sensor devices 66 may be mounted on the exhaust processing device 24. The sensor devices 66 may be configured to provide information that is displayed via indicators (not shown) coupled to the sensor device 66. Accordingly, the indicators may be positioned on the exterior of the exhaust processing device 24 or communicate information to other devices such as a display near the steering column or the genset 18 (e.g., wirelessly or by way of various connection devices existing between the mounting face 36 and the exhaust manifold 26). For example, one or more temperature sensors could be mounted on the exhaust processing device 24 to indicate the temperatures at various locations on the device (e.g., at the catalyst 50 or along the outer surface 52 of the tubular structure 28). Also, for example, a pressure sensor could be located within the intermediate annular space 31 that would indicate a blockage of the flow of water through that space. Such pressure information could be of value in preventing excessive strain on an impeller of the pump 61.

Therefore, the above-described invention provides a system and method for integrating conventional catalytic conversion elements (or other exhaust processing elements) such as those employed on automobiles with gensets used on small watercraft for the purpose of processing exhaust gases discharged from the gensets. In this regard, the present invention includes a cooling chamber surrounding an inner exhaust-processing chamber to allow coolant to flow about the exhaust processing chamber and prevent heat from the catalytic conversion process to excessively raise the temperature of an outer surface of the overall device. Additionally, the present invention, in at least some embodiments, provides a system and method for the coolant that is directed through the cooling chamber to be drawn from the genset itself. Accordingly, the coolant is water that is obtained from the body of water within which the watercraft is operating and then returned to that body of water after use.

While the foregoing illustrates and describes various embodiments of this invention, it is to be understood that the invention is not limited to the precise construction herein disclosed. The invention can be embodied in other specific forms without departing from the spirit of the invention. For example, the present invention is intended to be applicable to a wide variety of water vehicles and other (e.g., non-vehicular) devices that employ gensets in proximity to a water source. The present invention is also intended to be used with exhaust processing systems that employ a variety of different types of catalysts, catalytic conversion devices, or other exhaust processing elements.

Also, for example, the water provided to the exhaust processing device need not be provided via the exhaust manifold of a genset as discussed above, but rather could be provided via a separate supply line or other mechanism. Also, in certain embodiments, more than one catalyst could be used and the tubular sections 28, 30 could vary from tubes having circular cross-sections to other tubular structures or other conduits having other shapes (e.g., oval or rectangular cross-sections).

Therefore, one aspect of the invention includes an exhaust processing device for implementation in a marine environment. The exhaust processing device includes an inner tubular structure configured to receive exhaust gases from a generator set (genset) and communicate the exhaust gases therethrough. The exhaust processing device also includes an exhaust processing element mounted within the inner tubular structure to process the exhaust gases and an outer tubular structure mounted around the inner tubular structure to form an intermediate space therebetween. The exhaust processing device further includes at least one orifice through which to deliver a flow of water to the intermediate space to maintain the outer tubular structure at a temperature below a temperature of the exhaust processing element.

According to another aspect of the invention, a genset assembly for use in a watercraft includes a genset having an alternator and an engine with an exhaust manifold. The genset assembly also includes an exhaust processing device coupled to the exhaust manifold of the engine. The exhaust processing device further includes an inner conduit to receive exhaust from the exhaust manifold at an input end and allow the exhaust to pass therefrom to an output end and an exhaust processing element positioned within the inner conduit to reduce undesirable exhaust components. Additionally, the exhaust processing device includes an outer conduit positioned about the inner conduit to define an intermediate space therebetween, wherein upon operation of the genset, a temperature of the outer conduit is maintained to be lower than a temperature of the inner conduit by a flow of water through the at least one intermediate space.

According to still another aspect of the invention, an exhaust processing device for implementation in a marine environment includes an inner passage to receive exhaust gases from a genset and communicate the exhaust gases to an output port. The exhaust processing device further includes an exhaust processing element mounted within the inner passage to reduce undesirable components in the exhaust and an outer wall of the exhaust processing device surrounding the inner passage. Additionally, the exhaust processing device includes an insulating passage arranged between the exhaust processing element and the outer wall to receive a flow of water therethrough. Furthermore, the exhaust processing device includes an insulating chamber arranged between the exhaust processing element and the outer wall and having a static insulating medium disposed therein, wherein the insulating passage and the insulating chamber work in concert to maintain a temperature of the outer wall that is substantially reduced from the operating temperature of the exhaust processing element.

The present invention has been described in terms of the preferred embodiment, and it should be appreciated that many equivalents, alternatives, variations, and modifications, aside from those expressly stated, are possible and within the scope of the invention. Therefore, the invention should not be limited to a particular described embodiment. Accordingly, reference should be made to the following claims, rather than to the foregoing specification, as indicating the scope of the invention.

What is claimed is:

1. A watercraft comprising:
   a propeller configured to drive the watercraft;
   a first engine configured to drive the propeller;
   a first exhaust port extending at least partially through the propeller to expel exhaust generated by the first engine;
   a generator set (genset) having a second engine, an alternator configured to be driven by the second engine, and a second exhaust port to receive exhaust generated by the second engine;
   an exhaust processing device connected to the second exhaust port of the genset comprising:
      an inner passage to receive exhaust gases from the genset and communicate the exhaust gases to an output port;
      an exhaust processing element mounted within the inner passage to reduce undesirable components in the exhaust;
      an outer wall of the exhaust processing device surrounding the inner passage;
      an insulating passage arranged between the exhaust processing element and the outer wall to receive a flow of water therethrough;
      an insulating chamber separate from the insulating passage and arranged between the exhaust processing element and the outer wall and having a static insulating medium disposed therein; and wherein the insulating passage and the insulating chamber work in concert to maintain a temperature of the outer wall that is substantially reduced from an operating temperature of the exhaust processing element.

2. The watercraft of claim 1 wherein the static insulating medium includes at least one of air and fiberglass.

3. The watercraft of claim 1 further comprising at least one orifice in communication with the insulating passage and the genset, and wherein the flow of water through the insulating passage is received from the genset.

4. The watercraft of claim 1 wherein the exhaust processing element includes a catalytic converter.

5. The watercraft of claim 1 wherein the inner passage includes at least one expanded portion configured to receive the exhaust processing element.

6. The watercraft of claim 5 wherein the insulating passage completely separates the at least one expanded portion of the inner passage from the outer wall.

7. The watercraft of claim 6 wherein the insulating chamber is completely disposed between the inner passage and the insulating passage.

8. The watercraft of claim 1 further comprising a flapper valve positioned proximate an output port to prevent water backflow into the inner passage.

9. The watercraft of claim 1 further comprising a water intake configured to draw water from a body of water on which the watercraft is disposed, the water intake delivering water to the genset, and the genset delivering water to the insulating passage.

* * * * *